2,987,410
ASPHALTIC COMPOSITIONS

William A. Higgins and Robert G. Wurstner, Cleveland, Ohio, assignors to The Lubrizol Corporation, Wickliffe, Ohio, a corporation of Ohio
No Drawing. Filed Mar. 13, 1958, Ser. No. 721,099
9 Claims. (Cl. 106—273)

This invention relates to improved asphaltic compositions and in particular to such compositions which are peculiarly resistant to weathering. In a still more particular sense it relates to asphaltic compositions which are characterized by their stability with respect to "checking" and alligatoring."

The widespread use of asphalt as a roofing material and as an important element in road building is predicated largely upon its economic availability and generally satisfactory physical properties. Thus, while it is cheap it also is easily applicable as a coating material which rapidly solidifies to a relatively permanent and hard layer. As an ingredient in the preparation of roof surfaces, for example, it may be applied in molten form merely by brushing or mopping it evenly over the roof surface and allowing it to solidify by cooling. Or, alternatively, it may be applied to such a roof surface in a concentrated solution in an organic solvent; such a solution is well-known as a "cutback," and a cutback may be applied preferably by a spraying operation. Still another useful method of application of asphalt to a surface involves the use of aqueous emulsions, and these also are applied by spraying. In each of these latter instances the final asphaltic layer is obtained as a residue from evaporation of the solvent or water.

Although as indicated earlier asphalt coatings are characterized by a stability to ordinary conditions of weathering such as heat, rain, snow, etc. it is obviously desirable to extend and improve this stability. Studies of the deterioration of asphalt have revealed that the first indication of such deterioration is the appearance of minute cracks in the surface which form a nucleus for the further rapid deterioration of the asphalt. These minute cracks become enlarged until finally they reach down to the supporting surface for the asphalt coating and at this point of course the asphalt coating ceases to protect the under surface.

The minute cracks which appear first in the deterioration of the asphalt are known as "checks" and the process of their formation is referred to as "checking." If these checks develop into wider cracks the phenomenon is known as "alligatoring."

The principal object of this invention is the provision of an asphaltic composition which when applied to a surface subject to conditions of weathering, is characterized by its resistance to checking and alligatoring.

Another object of this invention is the provision of a class of additives which impart to asphaltic compositions the desirable characteristics indicated above.

Another object of the invention is the provision of a novel process for the stabilization of asphaltic surfaces.

Other objects of the invention will be apparent from the following description thereof.

The above objects are attained by a stabilized asphaltic composition comprising a major proportion of asphalt, from about 0.01% to about 10% by weight of a cuprous phosphorodithioate having the formula

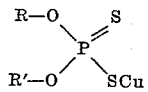

where R and R' are selected from the class consisting of saturated hydrocarbon radicals and saturated ether radicals, and from about 0.005% to about 3.0% by weight of a p-phenylene-diamine. Such compositions are characterized by their marked stability in all types of weather. They are notably unaffected either by extremely hot weather or by winter weather. They are especially resistant to conditions which ordinarily produce checking and alligatoring in the roof surface.

Cuprous phosphorodithioates are readily available from the reaction of copper powder with a phosphorodithioic acid. The reaction is carried out merely by mixing the two reactants preferably at a slightly elevated temperature, i.e., 50–100° C. Generally a solvent such as benzene is used to facilitate handling of the reaction mixture, but in the interest of economy this refinement may be omitted.

Preparation of the phosphorodithioic acid precursor of the copper phosphorodithioate may be effected by the well-known reaction of phosphorus pentasulfide with four equivalents of an alcohol or phenol. The reaction is carried out at temperatures within the range of 50–150° C. Mixtures of alcohols and phenols may be used in the reaction thus giving rise to phosphorodithioic acids containing dissimilar organic groups within the same molecule. Cuprous salts prepared from such phosphorodithioic acids having dissimilar organic groups are contemplated within the scope of this invention as well as those prepared from simple phosphorodithioic acids. Specific examples of alcohols and phenols which have been used in the preparation of phosphorodithioic acids to prepare the copper salts of this invention include ethyl, butyl, hexyl, decyl, cetyl, etc. alcohols, glycols, octyl phenol, heptyl phenol, cyclohexanol, and many others. It is apparent that the identity of R and R' in the formula above depends upon the alcohol or phenol which is used in the preparation of the phosphorodithioic acid.

The following examples illustrate the preparation of various cuprous phosphorodithioates such as are used in the asphaltic compositions described herein.

Example 1

Di(4-methyl-pentyl-2) phosphorodithioic acid was prepared by adding slowly, at 75–85° C., 1 mole of phosphorus pentasulfide to 4 moles of 4-methyl-pentan-2-ol, and heating the mixture at 75–85° C. for 1 hour. The reaction mixture was filtered and to 324 grams (1.09 mole) of the filtrate, which consists essentially of the acid, there was added, at 75–85° C., 64 grams (1.0 mole) of copper powder. The reaction mixture was heated at 75–85° C. for 16 hours and filtered. The filtrate consists essentially of the cuprous di(4-methyl-pentyl-2) phosphorodithioate having the following analysis:

Percent P _____ 8.9
Percent S _____ 17.1
Percent Cu _____ 15.7

Example 2

An alcohol mixture consisting of 962 grams (13 moles) of isobutyl alcohol and 616 grams (7 moles) of n-pentyl alcohol was heated to 55° C. and treated with 1110 grams (5 moles) of phosphorus pentasulfide at 55–60° C. The mixture then was heated at 60° C. for 3 hours and filtered. To 1228 grams (4.4 moles) of the filtrate, there was added at 70–80° C. 1000 ml. of benzene and 308 grams (4.8 moles) of copper powder. The mixture was heated at reflux for 21 hours and filtered. The filtrate, containing 39.5% of benzene, had the following analysis:

Percent P _____ 6.3
Percent S _____ 11.7
Percent Cu _____ 11.7

The cuprous phosphorodithioates useful in this invention are generally dark colored liquid, sometimes viscous materials which are highly compatible with asphalts. They generally are not chemically pure, and it is unnecessary to resort to purification procedures to render them acceptable for use as stabilizers for asphaltic compositions. The products prepared as in the two examples above are sufficiently pure for the purposes of this invention.

The p-phenylenediamines of this invention include not only p-phenylenediamine itself, but also the hydrocarbyl-substituted p-phenylenediamines a number of which are available commercially. A particularly valuable compound in the claimed combination of this invention is N,N'-dibutyl p-phenylene-diamine obtainable from the Tennessee Eastman Co. under the trade name of Tenamene II. Other valuable p-phenylenediamines for the purposes of this invention include the N-phenyl, N-naphthyl, N-p-xylyl, N,N'-diphenyl, N,N'-di-alpha naphthyl, N,N'-di-beta naphthyl, N,N'-di-p-xenyl, N,N'-di-isoamyl, N,N'-di-alkylphenyl, etc. p-phenylenediamine.

As indicated above many of these p-phenylenediamines are available commercially. Others may be prepared by the general reaction of hydroquinone with aliphatic or aromatic amines to form the corresponding N,N'-dihydrocarbyl p-phenylene-diamine. This reaction is illustrated by the following equation:

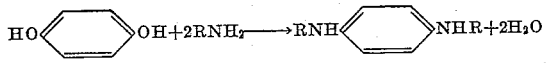

This reaction is described in detail with respect to the use of aliphatic amines in U.S. 2,163,639. The application of the reaction to the preparation of N,N'-diaryl p-phenylenediamines is discussed an Kirk-Othmer's "Encyclopedia of Chemical Technology," Interscience, vol. 10, at page 378 et seq.

p-Phenylenediamine itself may be prepared by the reduction with iron and hydrochloric acid of p-nitroaniline. Other reducing agents as discussed in the above Kirk-Othmer reference may be used satisfactorily. The mono-substituted products of p-phenylenediamine may be obtained by alkylation or arylation thereof with the appropriate halide.

The principal utility of the stabilized asphalts described herein is in the preparation of roof surfaces. They are useful also, though to a lesser extent, in the finishing treatment of highway and driveway construction. It is apparent that such applications involve the use of very large amounts of asphalt and that accordingly the utility of the process of this invention has far-reaching significance.

Many grades of asphalt are available today, most of them being derived from petroleum. Asphalts generally are graded according to their "needle penetration value" at a specified temperature, this value having been determined according to ASTM test D5-52. According to this test the depth of penetration measured in tenths of a millimeter of a standard needle is the needle penetration value. Those asphalts having a needle penetration value within the range of 0-200 at 77° F. are benefited most by the incorporation therein of small amounts of the cuprous phosphorodithioate and p-phenylenediamine additives of this invention.

The application of asphalt to a surface may be effected by the use either of hot asphalt, a solution of asphalt in an organic solvent (commonly referred to as a cutback) or an aqueous asphalt emulsion. The first of these forms is quite obviously the cheapest, but it suffers from some disadvantages which attend the necessarily high temperatures employed in its use. The latter two forms, while slightly more costly, enjoy the advantages of low temperature operation. These latter forms likewise are more adaptable to the improvements inherent in this invention. Asphalt cutbacks are concentrated solutions of asphalt in an organic solvent such as naphtha, kerosene, benzene, toluene, xylene, and the like; the concentration generally is in the range of 40-60% by weight. The cutback is applied by mopping or spraying, preferably the latter, and then allowing the solvent to evaporate leaving a hard residual asphalt layer. Asphalt emulsions may be applied similarly.

The amount of cuprous phosphorodithioate which must be used to accomplish the objects of this invention should exceed 0.01% by weight of the asphalt which is stabilized thereby. On the other hand amounts in excess of 10% of the asphalt which is stabilized do not appear to add significantly to the stability of the asphaltic product. To provide adequate, economical protection to an asphalt coating which is exposed to the serious extremes of weather conditions a concentration of a cuprous phosphorodithioate within the range of 0.5 to 2% is indicated. Higher concentrations than this will of course afford greater protection but in many instances this increased degree of protection may not be sufficient to justify the additional expense.

The concentration of the p-phenylenediamine component must exceed 0.005% and the effectiveness of the combination is approximately proportional to the concentration of the p-phenylenediamine up to about 3.0%. These percentages are based upon the weight of the asphalt which is stabilized by the combined additives. A particularly preferred range of concentration of the p-phenylenediamine is 0.5 to 1.5% based upon the weight of the asphalt.

The chief use of the asphaltic compositions of this invention involves the incorporation of the cuprous phosphorodithioate and p-phenylenediamine into an asphalt cutback or an asphalt emulsion, and the application of this material to a surface to be coated. The use of a cutback in such use normally is preferred because of the adaptability of a cutback to most conditions of weather including particularly conditions of low temperature. This method of use provides optimum results because of the ease with which the cuprous phosphorodithioate and a p-phenylenediamine may be dispersed uniformly throughout the asphaltic layer thus assuring uniform stability. Another valuable use of the invention is applicable to the problem of stabilizing asphaltic surfaces which have already been formed. If such asphaltic surfaces have not yet substantially deteriorated, they may be stabilized against further deterioration by applying a mixture of a cuprous phosphorodithioate and a p-phenylenediamine directly thereto. The cuprous phosphorodithioate and p-phenylenediamine may be applied either as such, or in a solution or emulsion, or in a concentrated cutback.

The stabilization which results from incorporation of the combination of additives described herein into an asphaltic composition has been observed by means of tests conducted in an accelerated weathering apparatus. Such apparatus is the "weatherometer," type DMC-H, manufactured by the Atlas Electric Device Co., Chicago, Illinois. The particular test used in this connection consisted of depositing uniformly 3 grams of asphalt on an aluminum panel (2¾ x 5⅞ x 1/33 inches); exposing this coated panel maintained in a vertical position to ultraviolet light and a temperature of 150° F., and cold tap water spray for nine minutes of each hour. The sample is observed hourly and the time required for the first appearance of any minute, hair-line cracks is recorded as the "stability" time.

The stability time of an asphalt surface which contains no stabilizing additive of any type is about 10-12 hours. The effectiveness of the stabilizing additives of this invention has been measured in terms of the degree of improvement imparted to an asphaltic surface by the incorporation of the additives into the asphalt. Thus for each test of a combination of additives a corresponding test on the same asphalt without the additives was conducted and a comparison of the stability times from these two tests provides a measure of the stability imparted to the asphaltic surface by the additives. This stability is indicated herein in terms of percent improvement, viz., an increase of the stability time of a sample of asphalt from 12 hours to 36 hours when that sample contains a small amount of a combination of additives represents a percent improvement of 200%.

A series of such stabilization tests and the results obtained therefrom are shown in the following table. Aluminum panels were coated with an asphalt cutback consisting of 60% of an air-blown asphalt having a needle penetration value of 25 at 77° F., 40% of benzene and the additives being evaluated. When all of the benzene had been evaporated the coated panel was placed in the weatherometer and subjected to above-described test conditions.

of the various combinations of additives which come within the scope of the invention. Many other cuprous phosphorodithioates, not listed in the table, have been found to be effective; many other p-phenylenediamines likewise have been found to be effective for the purposes of this invention. For example, cuprous di-isopropyl phosphorodithioate, cuprous di-n-butyl phosphorodithioate, cuprous di-(octylphenyl) phosphorodithioate, cuprous dicetyl phosphorodithioate, cuprous di-(heptylphenyl) phosphorodithioate, cuprous dicyclohexyl phosphorodithioate, the cuprous salt of a phosphorodithioic acid prepared by the reaction of $P_2S_5$ with a mixture of 2 equivalents of iso-octyl alcohol and 2 equivalents of bis(2-hydroxypropyl) ether, the cuprous salt of a phosphorodithioic acid prepared by the reaction of $P_2S_5$ with a mixture of 2.6 equivalents of isobutyl alcohol and 1.4 equivalents of n-amyl alcohol, and others have been found to be effective for the purposes of this invention.

Other modes of applying the principle of the invention may be employed, change being made as regards the details described, provided the features stated in any of the

| Cuprous Phosphoro-dithioate Additive | Weight Percent in Final Coating | Amine Additive | Weight Percent in Final Coating | Percent Improvement Over Unstabilized Coating |
|---|---|---|---|---|
| Cuprous di(4-methyl-pentyl-2) phosphorodithioate. | 1 | N-phenyl p-phenylenediamine. | 0.5 | 450 |
| Do | 1 | None | | 150 |
| None | | N-phenyl p-phenylenediamine. | 0.5 | 100 |
| Cuprous di(4-methyl-pentyl-2) phosphorodithioate. | 1 | N,N'-dibutyl p-phenylenediamine. | 0.5 | 380 |
| None | | do | 0.5 | 90 |
| Cuprous di(4-methyl-pentyl-2) phosphorodithioate. | 1 | N,N'-diphenyl p-phenylenediamine. | 0.5 | 450 |
| None | | do | 1.5 | 170 |
| Cuprous di(4-methyl-pentyl-2) phosphorodithioate. | 1 | N,N'-di-2-naphthyl p-phenylene-diamine. | 0.5 | 250 |
| None | | do | 1.5 | 65 |

The additives described and claimed herein are used most efficiently when incorporated directly into the asphalt prior to the application thereof to a roof surface. They are also, however, very effective in the stabilization of asphaltic surfaces when incorporated into the asphaltic surface of a roof. Thus in some instances it may be desirable to extend the usefulness of an asphaltic roof surface which has not yet exhibited any signs of deterioration. In such cases the cuprous phosphorodithioate and p-phenylene diamine additives may be applied directly, but preferably it should be painted or sprayed on from a solution or aqueous emulsion. Because of their compatibility with asphalt the cuprous phosphorodithioate and p-phenylenediamine readily impregnate the surface layer and act to stabilize the entire surface.

When the combination of additives described herein is applied to an already-existing roof surface the relative proportions of the two additives should be such as to impart at least 0.01% by weight (based upon the asphalt of the roof surface) of each of the cuprous phosphorodithioate and the p-phenylenediamine. Preferably the ratio of these two components when used in this fashion should be within the range of one part of cuprous phosphorodithioate to 0.25–1.0 part of p-phenylenediamine.

The present invention contemplates also the combined use of cuprous phosphorodithioates and p-phenylenediamines in asphalts which are admixed with mineral aggregates or other binding materials in the production of asphaltic coatings having enhanced load-carrying properties. The asphalts for use in such applications often contain other types of improving agents such as anti-stripping agents which function to improve the adhesion characteristics of the asphalt with the mineral aggregates.

The preceding tabulated test data is merely illustrative following claims or the equivalent of such be employed.

We therefore particularly point out and distinctly claim as our invention:

1. An asphaltic composition, stabilized with respect to checking and alligatoring, comprising a major proportion of asphalt, from about 0.01% to about 10% by weight of a cuprous phosphorodithioate having the structure

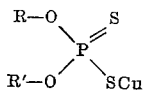

where R and R' are selected from the group consisting of alkyl, alkylaromatic, and saturated aliphatic ether radicals, and from about 0.005% to about 3.0% by weight of a p-phenylenediamine.

2. The stabilized asphaltic composition of claim 1 characterized further in that R and R' are alkyl radicals.

3. The stabilized asphaltic composition of claim 1 characterized further in that R and R' are 4-methylpentyl-2 radicals.

4. The stabilized asphaltic composition of claim 1 characterized further in that the p-phenylenediamine is an N-hydrocarbon-substituted p-phenylenediamine.

5. The stabilized asphaltic composition of claim 1 characterized further in that the p-phenylenediamine is N,N'-dibutyl p-phenylenediamine.

6. The stabilized asphaltic composition of claim 1 characterized further in that R and R' are alkyl radicals and the p-phenylenediamine is an N-hydrocarbon-substituted p-phenylenediamine.

7. The process of stabilizing an asphaltic surface with respect to checking and alligatoring, which comprises the application to said asphaltic surface of a mixture comprising one part of a cuprous phosphorodithioate having the structure

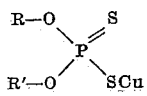

where R and R' are selected from the group consisting of alkyl, alkylaromatic, and saturated aliphatic ether radicals, and from 0.25 to 1.0 part of a p-phenylenediamine.

8. The process of claim 7 characterized further in that R and R' are alkyl radicals.

9. The process of claim 7 characterized further in that the p-phenylenediamine is N,N'-dibutyl p-phenylenediamine.

References Cited in the file of this patent

UNITED STATES PATENTS

| | | |
|---|---|---|
| 2,552,570 | McNab et al. | May 15, 1951 |
| 2,618,597 | McNab et al. | Nov. 18, 1952 |
| 2,703,784 | Fields | Mar. 8, 1955 |
| 2,797,169 | Mertens | June 25, 1957 |